United States Patent Office 3,775,388
Patented Nov. 27, 1973

3,775,388
ODOR IMPROVEMENT OF XANTHOGEN-MODIFIED CHLOROPRENE POLYMERS
Ausat Ali Khan, Newark, Del., assignor to E. I. du Pont de Nemours and Company, Wilmington, Del.
No Drawing. Filed Feb. 18, 1972, Ser. No. 227,659
Int. Cl. C08d 3/14; C08f 15/24, 3/32
U.S. Cl. 260—86.3 R          6 Claims

ABSTRACT OF THE DISCLOSURE

Polymerizing chloroprene in an alkaline aqueous emulsion in the presence of a dialkyl xanthogen disulfide chain transfer agent to form a chloroprene polymer latex and adding to the polymer latex at a time when the desired degree of polymerization has been reached a compound having the structure

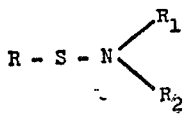

wherein R is hydrocarbyl, 2-thiazolyl, 2-benzothiazolyl radicals or

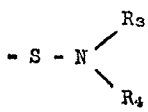

$R_1$, $R_2$, $R_3$, and $R_4$ are alkyl, cycloalkyl, or aralkyl and $R_1$ and $R_2$ or $R_3$ and $R_4$ together can form a saturated ring with the nitrogen.

BACKGROUND OF THE INVENTION

This invention relates to a process for preparing chloroprene polymers free from the disagreeable odor associated with vulcanizates of xanthogen-modified chloroprene polymers.

Polychloroprene has been prepared by polymerizing chloroprene in the presence of a free radical catalyst and a dialkyl xanthogen disulfide in an aqueous alkaline emulsion, as disclosed, for example, in Pat. 2,321,693. While the polymers thus prepared have many outstanding properties, they suffer from the disadvantage that the vulcanizates, i.e., cured polymers, have a disagreeable odor. Such odor has restricted the use of the polymers.

SUMMARY OF THE INVENTION

The present invention provides a process for substantially reducing the unpleasant odor associated with vulcanizates of chloroprene polymers in which a dialkyl xanthogen disulfide is used as the chain transfer agent. It has been found that chloroprene polymers free from this problem of disagreeable odor can be made when polymerizing chloroprene in an alkaline aqueous emulsion in the presence of a dialkyl xanthogen disulfide chain transfer agent to form a chloroprene polymer latex by adding to the polymer latex at a time when the desired degree of polymerization has been reached at least about 0.1 part by weight per hundred parts monomer of a compound having the structure

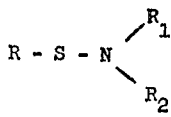

wherein R is hydrocarbyl, 2-thiazolyl, 2-benzothiazolyl radicals, or

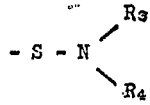

wherein $R_1$, $R_2$, $R_3$, and $R_4$ are alkyl, cycloalkyl, or aralkyl or $R_1$ and $R_2$ or $R_3$ and $R_4$ together can form a saturated ring with the nitrogen. The compound can be added to the polymer latex along with the short-stopping agent or it can be added separately after polymerization has been stopped. Compounds having the structure shown above include sulfenamides and N,N'-dithiobis(secondary amines). However for convenience, the additive will be hereinafter referred to as a sulfenamide. The preferred compound is 2-(morpholinothio)benzothiazole.

DETAILED DESCRIPTION OF THE INVENTION

According to the process of this invention, the polymerization of chloroprene, except for the addition of the sulfenamide to the polymer latex when a predetermined desired degree of polymerization has been reached, is conducted in a conventional manner in an aqueous alkaline emulsion using a free radical polymerization catalyst, e.g., alkali metal persulfates or organic peroxy compounds, at a temperature between 0° and 80° C., generally between 30° and 50° C. As is well known in the art, polymerization can be carried to a predetermined desired degree and stopped by use of conventional "short-stopping" agents. Unreacted monomer can be removed from the polymer latex by steam stripping and the like as illustrated, for example, in Patent 2,467,769.

Any compound represented by the above formula can be used in the process of this invention. The number of carbon atoms in the alkyl, cycloalkyl, or aralkyl radicals designated as $R_1$, $R_2$, $R_3$, and $R_4$ is not critical and the upper limit is a matter of practical considerations. These radicals are preferably hydrocarbon radicals, although they may contain substitutents which do not detrimentally affect the polymers. Generally, alkyl radicals will contain one to about 12 carbon atoms. The cycloalkyl rings will usually contain 5 to 7 carbon atoms, although polycyclic rings can be used containing up to 12 carbon atoms. The alkyl and cycloalkyl radicals should be free of olefinic unsaturation. The aralkyl radicals that are used are those in which an aryl radical, preferably phenyl, is attached to the alkyl or a cycloalkyl radical. The cycloalkyl radicals can be substituents on the alkyl radicals or the cycloalkyl radicals can be substituted with alkyl radicals of other cycloalkyl radicals. When the radical designated as R is hydrocarbyl, it, likewise, may be alkyl, cycloalkyl, or aralkyl of the same types described for the $R_1$, $R_2$, $R_3$, and $R_4$ radicals. In addition, the R radical can be an aryl radical, preferably phenyl or phenyl substituted with alkyl or cycloalkyl groups of the same type as previously described.

When the $R_1$ and $R_2$ or $R_3$ and $R_4$ substituents of the above formula form a saturated ring, it may be morpholine or a saturated ring containing only carbon and hydrogen in addition to the nitrogen. In general, each ring will contain 5 to 7 members, including the nitrogen, although polycyclic rings may contain, for example, up to 12 members. The rings may be substituted with hydrocarbon radicals, particularly with alkyl, cycloalkyl, or aryl hydrocarbon radicals containing up to 6 carbon atoms. Representative examples of radicals of the type in which —NR$_1$R$_2$ or —NR$_3$R$_4$ are part of a cyclic structure are morpholino (i.e., 4-morpholinyl), 2,6-dimethylmorpholino, 3,5-dimethylmorpholino, piperidino (i.e., 1-piperidyl), 1-pyrrolidinyl, hexahydro-1-azepinyl, 3-azabicyclo[3.2.0]hept-3-yl, and 3-azabicyclo[3.2.2]non-3-yl.

When R is 2-benzothiazolyl, the structure can be shown as follows:

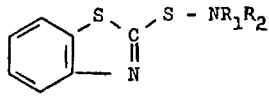

Examples of suitable compounds where R$_1$ and R$_2$ are alkyl, cycloalkyl, or aralkyl are those in which the —NR$_1$R$_2$ are as follows: N-cyclohexyl-N-(4-cyclohexylcyclohexyl), N-cyclohexyl-N-cyclopentyl, N,N-dicyclohexyl, N,N-dimethyl, N,N-diethyl, N,N-diisopropyl, N,N-dipropyl, N,N-dibutyl, N,N-dicyclopentyl, N,N-dibenzyl, and N,N-diphenethyl. Examples of compounds in which the group NR$_1$R$_2$ is a saturated ring are the following:

2-(morpholinothio)benzothiazole,
2-(pyrrolidinothio)benzothiazole,
2-(piperidinothio)benzothiazole,
2-(2,6-dimethylmorpholinothio)benzothiazole,
2-(3,5-dimethylmorpholinothio)benzothiazole,
2-(3-azabicyclo[3.2.0]hept-3-ylthio)benzothiazole, and
2-(3-azabicyclo[3.2.2]non-3-ylthio)benzothiazole.

When R is 2-thiazolyl, the structure is as follows:

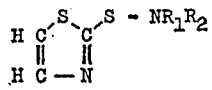

As stated previously, the hydrogens of the thiazole ring can be replaced with hydrocarbon radicals. Examples of suitable compounds of this type include the following:

N,N-dicyclohexyl-4-phenyl-2-thiazolesulfenamide,
N,N-dicyclopentyl-4-phenyl-2-thiazolesulfenamide,
N,N-diethyl-2-thiazolesulfenamide,
N,N-dimethyl-4,5-dimethyl-2-thiazolesulfenamide,
4-ethyl-N,N-dimethyl-2-thiazolesulfenamide, and
N,N,4,5-tetramethyl-2-thiazolesulfenamide.

Examples of compounds in which R is hydrocarbyl are as follows:

N,N-diethylbenzenesulfenamide,
N,N-diisopropylbenzenesulfenamide,
N,N-dimethylcyclohexenesulfenamide,
N,N-dibutylphenylethanesulfenamide,
N,N-diethyl-p-toluene-sulfenamide,
N,N-dimethyl-p-toluenesulfenamide,
N,N-dipropyl-p-toluenesulfenamide,
N,N-diethylethanesulfenamide,
N,N-dibutyl-1-hexanesulfenamide,
4-(benzylthio)morpholine,
4-(tert-butylthio)morpholine,
4-(cyclohexylthio)morpholine,
4-(methylthio)morpholine,
1-(methylthio)piperidine, and
1-(cyclohexylthio)piperidine.

Examples of compounds having the structure

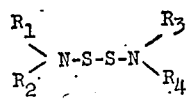

are N,N'-dithiobis(dimethylamine), N,N'-dithiobis(diethylamine), N,N'-dithiobis(diisopropylamine), N,N'-dithiobis(dibutylamine), N,N'-dithiobis(diamylamine), N,N'-dithiobis(dioctylamine), and similar compounds in which the alkyl group contains up to 12 carbon atoms. Other examples are 1,1'-dithiodipiperidine, 4,4'-dithiodimorpholine, 4,4'-dithiobis(2,6-dimethylmorpholine), 4,4'-dithiobis(3,5-dimethylmorpholine), N,N'-dithiobis(dicyclohexylamine), N,N'-dithiobis(N-methylcyclohexylamine), N,N'-dithiobis(N-ethylcyclohexylamine), N,N'-dithiobis(dibenzylamine), N,N'-dithiobis(diphenethylamine), 1,1'-dithiobis(2-methylpiperidine), and 1,1'-dithiodipyrrolidine.

The amount of sulfenamide added to the polymer latex when the desired degree of polymerization has been reached is at least about 0.1 part per hundred parts monomer. This amount is required in order to produce a significant improvement in the odor of the vulcanizates. In general, no more than 2 parts per hundred parts monomer is required, although larger amounts, e.g., 5 parts per hundred parts monomer, can be used without detrimental effects, although there is no advantage in using much more than 2 parts per hudnred. Preferably, amounts of about from 0.15 to 1 part sulfenamide per hundred parts monomer is added. The sulfenamide can be added to the latex along with the short-stopping agents or it can be added separately after polymerization has been stopped, either procedure being equally successful. It is preferred, however, to add the sulfenamide before the removal of excess monomer from the polymer latex because the presence of unreacted chloroprene tends to solubilize the sulfenamide and improve contact with the components of the reaction mixture. Excess monomer is removed by any conventional method, for example, steam stripping. It is believed that the sulfenamide reacts with unreacted dialkyl xanthogen disulfide chain transfer agent and the excess remains dispersed in the polymer during isolation.

The dialkyl xanthogen disulfides used in the process of this invention are represented by the following structure:

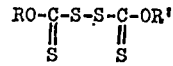

wherein R and R' are alkyl radicals having 1 to 8 carbon atoms. Examples of suitable alkyl radicals are methyl, ethyl, propyl, isopropyl, and the various isomeric butyl, amyl, hexyl, heptyl, and octyl radicals. Generally, the dialkyl xanthogen disulfides used are those in which each alkyl radical has 1 to 4 carbon atoms, especially diethyl xanthogen disulfide. In general, the amount of dialkyl xanthogen disulfide used ranges from about 0.15 to 1 part per hundred parts of monomer. However, the process of this invention can be used in preparing low molecular weight polymers using up to about 18 parts by weight of dialkyl xanthogen disulfide per hundred parts monomer.

The concentration of organic monomer present in the starting emulsion can vary within a wide range. In general, 30 to 55% by weight, based on the total weight of the emulsion, is the range of concentrations of organic monomer used in the preparation of the polymer. It is to be understood that up to 50% of the chloroprene can be replaced by another copolymerizable monomer. Representative comonomers that can be used in the process include vinyl aromatic compounds, such as styrene, the vinyl toluenes, and vinyl naphthalenes; aliphatic conjugated diolefin compounds such as 1,3-butadiene, isoprene, 2,3-dimethyl-1,3-butadiene, and 2,3-dichloro-1,3-butadiene; vinyl ethers, esters, and ketones, such as methyl vinyl ether, vinyl acetate, and methyl vinyl ketone; esters, amides, and nitriles of acrylic and methacrylic acids, such as ethyl acrylate, methyl methacrylate, methacrylamide, and acrylonitrile.

If a portion of the polymer is to be in gel form, as illustrated in Example 2, gel can be prepared by including in the mixture of monomers up to 5% of a cross-linking monomer containing 2 or more polymerizable double bonds which will copolymerize with the other monomers. Examples of such cross-linking monomers are esters of acrylic or methacrylic acid with polyhydric alcohols or phenols or polyvinyl aromatic compounds.

Conventional emulsifying agents employed in chloroprene polymerization processes are used in the present process for preparing the monomer emulsion and include the water-soluble salts, particularly the sodium or potassium salts of compounds of the following types: longchain fatty acids; rosins, or rosin derivatives, such as wood rosin, tall oil rosin, disproportionated rosins, or partially polymerized rosin; higher alcohol sulfates; and arylsulfonic acids such as alkylbenzenesulfonic acids and the condensation product of formaldehyde with a naphthalenesulfonic acid.

Ascertaining the particular degree of polymerization desired is within the skill of the art and depends on the amount of dialkyl xanthogen disulfide used and the type of polymer being prepared. For economic reasons, monomer conversion is usually at least about 50%, although this is not critical. Generally, if a solid sol polymer is being prepared, conversion is usually about 60 to 85%. If a gel polymer is being prepared, conversion can proceed to about 90% up to complete conversion. If a low molecular weight polymer is being prepared in the presence of a relatively large amount of dialkyl xanthogen disulfifide, polymerization can be carried to substantially complete conversion, that is, 90–100%. Any of the conventional so-called "short-stopping" agents, such as those disclosed in Patent 2,576,009, can be added to the polymerization mixture of the present invention to stop polymerization.

The chloroprene polymers prepared according to this invention, when vulcanized, i.e., cured and compounded by conventional technique, e.g., Du Pont Chemicals for Elastomers, Bulletin No. 63, NA-101, are substantially free from the disagreeable odor associated with chloroprene polymers polymerized in the presence of a dialkyl xanthogen disulfide and still exhibit good physical properties, e.g., tensile strength, modulus, elongation, and tear strength.

For a clearer understanding of the invention the following specific examples are given as being illustrative.

EXAMPLE 1

Samples of chloroprene polymers are prepared by polymerizing chloroprene in in an alkaline aqueous emulsion using the following recipes:

|  | Parts by weight | |
|---|---|---|
|  | A | B |
| Chloropene | 100 | 89.3 |
| 2,3-dichloro-1,3-butadiene | 0 | 10.7 |
| Disproportionated rosin ("Resin 731-S," Hercules) | 3 | 2.85 |
| Diethyl xanthogen disulfide | 0.45 | 0.5 |
| Water | 116.5 | 91.96 |
| Sodium hydroxide | 0.55 | 0.53 |
| Sodium salt of condensate of formaldehyde and a naphthalenesulfonic acid ("Lomar" PW, Nopco Chemical Co.) | 0.4 | 0.4 |

Polymerization is carried out at 40° C. using as catalyst an aqueous solution containing 1.5% potassium persulfate and 0.075% sodium 2-anthraquinonesulfonate.

Polymerization is stopped by addition of an emulsion containing approximately equal parts of phenothiazine and 4-tert-butylpyrocatechol. (0.01 to 0.02 part) In sample B the emulsion also contains about 0.5 part of 2,6-di-tert-butyl-4-phenylphenol. After polymerization has been stopped, 0.2 part of 2-(morpholinothio)-benzothiazole is added to the latex. The emulsion is prepared from the following ingredients:

| | Parts by weight |
|---|---|
| Water | 3.0 |
| Sodium lauryl sulfate | 0.4 |
| Toluene | 3.6 |
| 2-(morpholinothio)benzothiazole | 3.0 |

Unreacted monomer is removed by turbannular steam stripping, the pH is adjusted to about 5.6 with dilute acetic acid, and the polymer is isolated on a freeze drum as described in U.S. Patent 2187,146. The Mooney viscosities of the isolated polymers (ML 1+2.5/100° C.) are 44–46. Monomer conversion of Polymer A is 64.5% and that of B is 56.2%.

Samples of the polymers are compounded and cured using the following recipe:

| | Parts by weight |
|---|---|
| Polymer | 100 |
| Stearic acid | 0.5 |
| N-phenyl-1-naphthylamine | 2 |
| Magnesia | 2 |
| Semi-reinforcing furnace black | 58 |
| Naphthenic oil | 10 |
| Paraffin | 1 |
| Zinc oxide | 5 |
| Tetramethylthiourea | 1 |
| N-cyclohexyl-2-benzothiazole-sulfenamide (accelerator) | 0.75 |

The samples are cured in a mold at 153° C. for 30 minutes.

The vulcanizates are substantially free from the disagreeable odor associated with xanthogen-modified polychloroprene.

EXAMPLE 2

A mixture of a sol (benzene-soluble) and gel (benzene-insoluble) chloroprene polymers is prepared by preparing separate latexes and mixing the latexes before isolation of the polymer. The recipes for the alkaline aqueous emulsions of monomer are as follows. (Parts are by weight).

| | Parts | |
|---|---|---|
| | Gel | Sol |
| Chloroprene | 97 | 100 |
| Ethylene dimethacrylate | 3 | 0 |
| Disproportionated rosin ("Resin 731-S," Hercules) | 3 | 3 |
| Diethyl xanthogen disulfide | 0.4 | 0.45 |
| Water | 110.5 | 116.5 |
| Sodium hydroxide | 0.67 | 0.55 |
| Sodium salt of condensate of formaldehyde and a naphthalenesulfonic acid ("Lomar" PW, Nopco Chemical Co.) | 0.7 | 0.4 |
| Sodium 2-anthraquinonesulfonate | 0.007 | |

Polymerization is carried out at 40° C. using the same catalyst as in Example 1. The last stage of the polymerization of the gel component is carried out at 45° C. using a 5% solution of potassium persulfate containing about 0.04% sodium 2-anthraquinonesulfonate. Monomer conversion of the sol component is about 70% and that of the gel component is about 95%. Polymerization is stopped by addition of an emulsion containing equal amounts of phenothiazine and 4-tert-butylpyrocatechol (about 0.03 part in the case of the gel polymer and about 0.014 part in the sol polymer, per 100 parts of monomer). The short-stop emulsion added to the sol polymer contains 0.35 part of 2-(morpholinothio)benzothiazole. The stabilizer emulsion added to the gel polymer contains 2.26 parts of 2,6-di-tert-butyl-4-phenylphenol. The two latexes are intimately mixed in a proportion to give an isolated polymer containing 22 parts of the gel polymer and 78 parts of the sol polymer. Unreacted monomer is removed and polymer is isolated as described in Example 1.

Samples of the polymer are compounded and cured as in Example 1. The vulcanizates are substantially free from the disagreeable odor associated with xanthogen-modified polychloroprene.

I claim:
1. In a process for substantially reducing disagreeable odor associated with vulcanizates of xanthogen-modified chloroprene polymers which comprises polymerizing chloroprene in an alkaline aqueous emulsion in the presence of a dialkyl xanthogen disulfide chain transfer agent to form a chloroprene polymer latex, the improvement which comprises adding to the polymer latex at a time when the desired degree of polymerization has been reached at least about 0.1 part by weight per hundred parts monomer of a compound having the structure

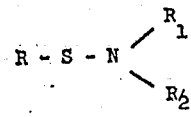

wherein R is 2-thiazolyl or 2-benzothiazolyl radicals wherein $R_1$ and $R_2$ are alkyl, cycloalkyl, and aralkyl or $R_1$ and $R_2$ together can form with the nitrogen, a morpholine ring or a saturated ring containing only carbon and hydrogen in addition to the nitrogen.

2. A process of claim 1 wherein said compound is 2-(morpholinothio)benzothiazole.

3. A process of claim 1 wherein about from 0.1–2 parts of said compound by weight per hundred parts monomer is added to the polymer latex.

4. A process of claim 2 in which the chain transfer agent is diethyl xanthogen disulfide.

5. A process of claim 1 wherein the said compound is added with a short-stopping agent.

6. A process of claim 1 wherein the said compound is added after polymerization and before removal of excess monomer.

References Cited

UNITED STATES PATENTS

| | | | |
|---|---|---|---|
| 2,662,876 | 12/1953 | Antlfinger | 260—82.7 |
| 3,392,134 | 7/1968 | Apotheker | 260—29.7 |

JOSEPH L. SCHOFER, Primary Examiner

C. A. HENDERSON, Jr., Assistant Examiner

U.S. Cl. X.R.

260—29.7 SQ, 63 BB, 80.3 N, 82.1, 85.5 XA, 85.5 S, 87.1 R, 87.5 R, 92.3 R